United States Patent [19]

Wakabayashi

[11] 4,138,007
[45] Feb. 6, 1979

[54] SYNCHRONIZER

[75] Inventor: Takaoki Wakabayashi, Toyota, Japan

[73] Assignee: Aisin Seiki Kabushiki Kaisha, Kariya, Japan

[21] Appl. No.: 795,842

[22] Filed: May 11, 1977

[30] Foreign Application Priority Data

May 15, 1976 [JP] Japan .................................. 51/61535

[51] Int. Cl.$^2$ ............................................. F16D 23/06
[52] U.S. Cl. .................................................... 192/53 E
[58] Field of Search ............................. 192/53 E, 53 F

[56] References Cited
U.S. PATENT DOCUMENTS

| | | | |
|---|---|---|---|
| 2,369,861 | 2/1945 | Schotz | 192/53 E |
| 2,391,268 | 12/1945 | Peterson et al. | 192/53 E |
| 2,479,184 | 8/1949 | Peterson et al. | 192/53 E |
| 2,555,961 | 6/1951 | Dunn | 192/53 E |
| 3,365,039 | 1/1968 | Stott et al. | 192/53 F |

*Primary Examiner*—Allan D. Herrmann
*Attorney, Agent, or Firm*—Sughrue, Rothwell, Mion, Zinn and Macpeak

[57] ABSTRACT

The synchronizer for selectively coupling a pair of gears which are journalled on a shaft includes a coupling sleeve slidably splined on the shaft for selective engagement with the gears. A pair of synchronizer rings are provided for frictional engagement with the gears. The synchronizer rings which are formed from sheet steel stampings are provided with three axially directed combination guide pins and blocker pins which extend into three respective recesses in the guide sleeve. In one embodiment the rings are biased toward each other with the extensions on one ring overlapping the extensions on the other ring and in a second embodiment the extensions on each ring extend into opposite ends of a common member slidably mounted in the recesses in the coupling sleeve.

9 Claims, 18 Drawing Figures

SYNCHRONIZER

BACKGROUND OF THE INVENTION

1. Field of the Invention

The present invention is directed to a synchronizer and more specifically to a pair of synchronizer rings carried by a coupling sleeve for frictional engagement with said gears to facilitate positive coupling of said sleeve with said gears.

2. Prior Art

Synchronizers of the type shown in the U.S. Pat. No. 3,078,975 to Eaton are comprised of a pair of axially spaced apart friction rings which are coupled to each other by a plurality of blocker pins which extend through corresponding recesses in a coupling sleeve. A plurality of energizer pins are also coupled between the two rings and extend through a separate set of apertures in the coupling sleeve. The energizer pins are each comprised of a hollow split sleeve having spring means therein for biasing the halves of the sleeve into engagement with the apertures through which they extend. Since the blocker pins and the energizer pins each have a number of parts the total number of parts for this type of construction is extremely high thereby adding significantly to the cost of construction and assembly time.

The U.S. Pat. No. 3,426,623 to Abbott utilizes synchronizer detector rings which can be formed as sheet steel pressings having axial extensions which are disposed in recesses in the coupling sleeve. However, in this patent the synchronism detection rings are always biased by spring washers into engagement with the gears so that there is always frictional drag between the rings and the gears which will create excessive heat and wear and cause a loss of power. Furthermore, due to the constant spring force on the synchronizer rings the circumferential movement of the synchronizer rings relative to the coupling sleeve must always be accomplished against the resistance of this spring force thereby rendering it difficult to align the axial projections with the recesses in the coupling sleeve to facilitate positive engagement of the coupling sleeve with the gear.

SUMMARY OF THE INVENTION

The present invention provides a novel synchronizer construction which obviates all of the foregoing drawbacks associated with the prior art constructions.

The present invention provides a synchronizer construction characterized by a substantial reduction in the total number of parts and significantly improved ease of operation.

The present invention provides a synchronizer construction including a pair of separate independent synchronizer rings having axial extensions which function both as guide means and blocking means.

The present invention is directed to a synchronizer comprising a shaft, a pair of gears rotatably mounted on said shaft, said gears having splines and tapered surfaces, at least a pair of synchronizer rings having tapered surfaces co-acting with the tapered surfaces of said gears, respectively, and extensions having step portions, a sleeve member connected by splines to said shaft and having recesses in which said extensions of said rings are positioned, said splines and said sleeve member being adapted to mesh with said splines of said gears and resilient biasing means carried by said sleeve member and engaging said extensions of said rings to move said extensions with said sleeve until said step portions of said rings are brought into contact with said recesses of said sleeve member.

The foregoing and other objects, features and advantages of the invention will be apparent from the following more particular description of preferred embodiments of the invention as illustrated in the accompanying drawings.

BRIEF DESCRIPTION OF THE DRAWINGS

FIG. 11a is a side elevation view of a modified form of thrust piece usable with the second embodiment.

FIG. 11b is an end view of the modified thrust piece shown in FIG. 11a.

DETAILED DESCRIPTION OF THE INVENTION

Figure 1:
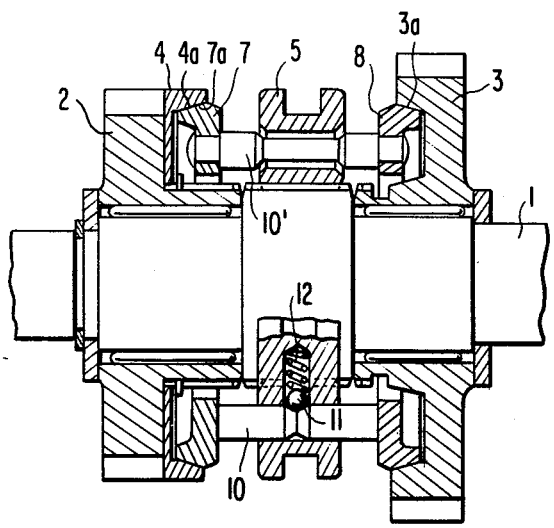
FIG. 1 is a longitudinal sectional view of a typical prior art synchronizer construction.

The prior art synchronizer construction shown in FIG. 1 includes a shaft 1 having a pair of gears 2 and 3 rotatably mounted thereon. The gear 3 is provided with a friction surface 3a and a separate member 4 having a friction surface 4a is secured to the gear 2. A coupling sleeve 5 is splined for longitudinal sliding movement on the shaft 1 for movement into engagement with splines on the gears 2 and 3. A pair of synchronizing rings 7 and 8 are disposed between the coupling sleeve 5 and the gears 2 and 3, respectively. The synchronizing rings 7 and 8 are each provided with friction surfaces 7a and 8a, respectively, which are complementary to and engageable with the friction surfaces 4a and 3a, respectively. The synchronizing rings 7 and 8 are connected to each other by a plurality of blocker pins 10' which extend through apertures in the coupling sleeve 5. Additional guide pins 10 extend between the synchronizer rings 7 and 8 and are provided with a detent into which a ball 11 is biased by means of spring 12. Thus, upon longitudinal movement of the coupling sleeve 5 toward one gear or the other the associated synchronizer ring will be forced into frictional engagement with the friction surface associated with the gear. The difference in speed of rotation between the gear and the sleeve which is splined to the shaft will move the blocker pins into engagement with the sides of the aperture in the coupling sleeve to prevent further movement of the coupling sleeve toward the splines on the gear. When the gear and the shaft have been brought into synchronism due to the frictional engagement between the synchronizer ring and the gear continued pressure on the coupling sleeve in the longitudinal direction will cam the blocker pins in a circumferential direction and the force of the spring 12 will be overcome to allow continued longitudinal movement of the coupling sleeve into engagement with the splines on the respective gear. Thus, according to such an arrangement the synchronizer rings are interconnected by means of the blocker pin and a separate set of guide pins are provided.

According to a first embodiment of the present invention as seen in FIGS. 2-6 the gears 2 and 3 are journalled on the shaft 1 in the same manner as in the prior art construction of FIG. 1. The gears 3 and 2 are each provided with friction surfaces 3a and 4a as well as splines 3b and 2b, respectively. A coupling sleeve 15 is provided with splines 15g which are slidably meshed with the splines on the shaft 1 to permit longitudinal sliding movement of the sleeve. The sleeve 15 is provided with three equally spaced radial recesses 15d, the side edges of which are chamfered at 15a.

A pair of synchronizer rings 17 and 18 are provided which may be formed from sheet steel pressings. The ring 17 is provided with a conical friction surface 17a which is complementary to and adapted to be engaged with the friction surface 4a associated with the gear 2. The ring 17 is provided with three equally spaced axial projections 17b having a narrower end portion connected to the wider portion by tapered shoulders 17c. The projections are slidably disposed on the bottom surfaces 15e of the recesses 15d in the sleeve 15. An annular groove 15b in sleeve 15 receives an annular resilient member 16, one end of which is anchored in an axially directed hole 15c in the sleeve 15. The spring 16 projects outwardly above the groove for engagement in notches 17d on the radially inner surfaces of the projections 17b adjacent the ends thereof.

A second synchronizer ring 18 similar to the ring 17 is provided with a conical friction surface 18a complementary to and adapted to be engaged with the friction surface 3a of the gear 3. The ring 18 is provided with three equally spaced axially extending extensions 18b having a narrower end connected to the wider portion by means of tapered shoulders 18c. The extensions 18b are positioned on extensions 17b within the recesses 15d with the ends of the extensions 18b being biased into contact with the radially directed surface of the ring 17 by means of a spring 19 which is connected between the two rings 17 and 18 through the aperture 15f in the sleeve 15.

Figure 2:
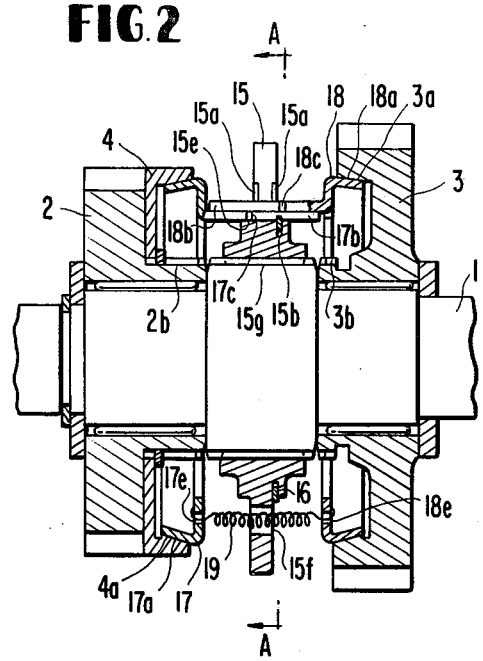
FIG. 2 is a longitudinal sectional view of one embodiment of a synchronizer construction according to the present invention.
Figure 3:
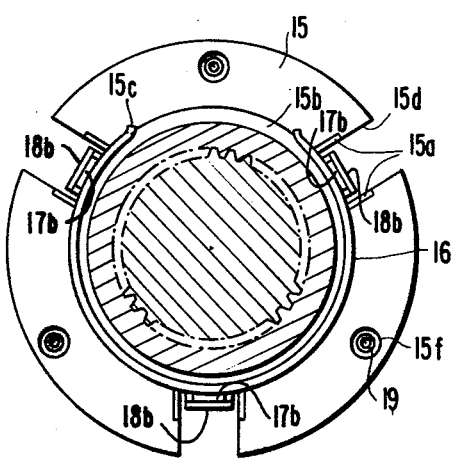
FIG. 3 is a sectional view taken along the line A—A in FIG. 2.
Figure 4:
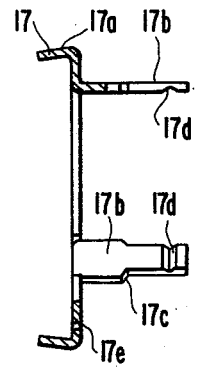
FIG. 4 is a sectional view of a synchronizer ring according to the present invention.
Figure 5:
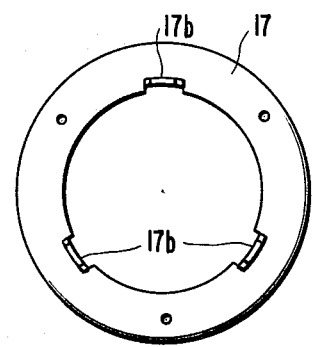
FIG. 5 is an end elevation view of a synchronizer ring according to the present invention.
Figure 6A:
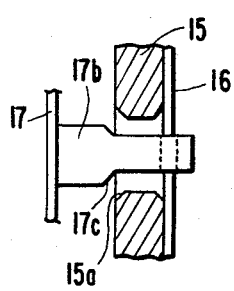
FIGS. 6a, 6b and 6c are schematic explanatory views showing a sequence of operations during synchronization.
Figure 6B:
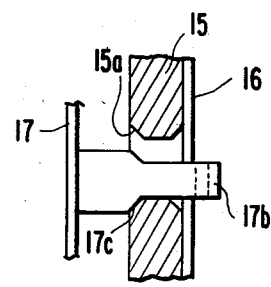
Figure 6C:
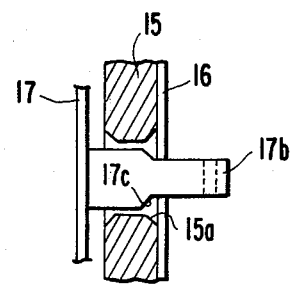

In the operation of the first embodiment the sleeve 15 is moved toward the left or the right as viewed in FIG. 2 depending upon whether it is desired to couple the gear 2 or 3 to the shaft 1. For purposes of illustration the synchronizing operation will be described with respect to the gear 2. Upon movement of the sleeve 15 to the left when the shift lever (not shown) is operated the ring 17 will be moved in the same direction since the ring 17 is coupled to the sleeve 15 by means of the spring 16 in the notch 17d. The conical friction surfaces 17a and 4a will be brought into engagement and due to the differences in rotational speeds the rings 17 will be circumferentially shifted from its neutral position shown in FIG. 6a to the position shown in FIG. 6b wherein the extensions 17b are brought into contact with the side walls of the recesses 15d. Further movement of the sleeve 15 results in the gradual disengagement of the resilient member 6 from the notch 17d and the chamfered portions 15a of the recesses 15d are brought into frictional engagement with the tapered portions 17c on the axial projections 17b. Until synchronization is achieved between the gear 2 and the ring 17 it is not possible to shift the sleeve 15 any further. After synchronization is achieved, that is the shaft 1 and the gear 2 are rotating at the same speed, the chamfered surfaces 15a on the sleeve 15 will cam the synchronizer ring 17 circumferentially to allow the wider portion of the axial projections 17b to enter into the recesses 15d of the sleeve thereby permitting meshing of the splines 15g of the sleeve 15 with the splines 4b on the gear 2. The operation for obtaining synchronization of the gear 3 with the shaft 1 prior to engagement of the splines of the sleeve 15 with the splines 3b would be identical.

In the second embodiment of the invention according to FIG. 7-11 the shaft and gears are identical to those set forth in the previous embodiment and the synchronizer rings and coupling sleeve are slightly modified. The synchronizer rings 27 and 28 are also formed as sheet steel stampings with a configuration similar to the rings 17 and 18 in the first embodiment. The two rings 27 and 28, however, are identical and only the construction and operation of the ring 27 will be treated in detail.

Figure 8B:
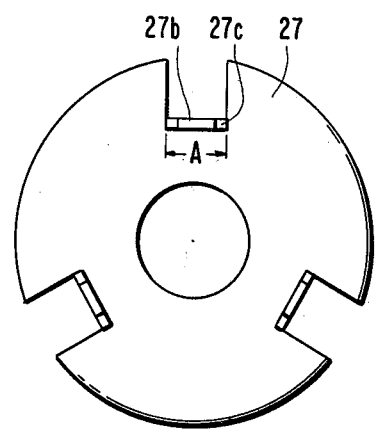
FIG. 8b is an end elevation view of a synchronizer ring according to the present invention.
Figure 8A:
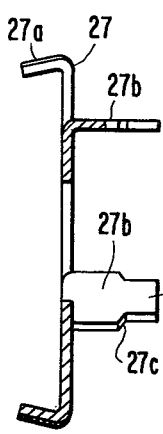
FIG. 8a is a sectional view of a synchronizer ring according to the present invention.

As best seen in FIGS. 8a and 8b the ring 27 is provided with a conical friction surface 27a comlementary to and adapted to engage the conical friction surface 4a on the gear 2. The ring 27 is provided with three equally spaced axially extending projections 27b with the outermost end having a width substantially less than the width A of the guide portion of the projection. The narrow end is connected to the wider guide portion by means of tapered shoulders 27c.

The coupling sleeve 25 is provided with three circular apertures extending therethrough. A tubular thrust piece 20 is disposed in each aperture having a reduced diameter central portion defining an annular recess 20a and a transverse wall 20b adjacent the annular recess. A ball 21 is disposed in a bore 25b' and is biased into engagement with the annular recess 20a by means of a spring 22. The opposite ends of the tubular thrust piece are provided with longitudinally extending slots through which the wide guide portion of the axial projections of the synchonizer rings may protrude. The opposite ends of the tubular thrust piece are bent inwardly to form guide fingers 20c for engaging the axial projections on the synchronizing rings. In lieu of the hollow tubular construction the thrust piece could be constructed as a solid thrust piece 30 as viewed in FIG. 11 having the annular recess 30a about the central portion and a slot 30b formed in each end.

Figure 7:
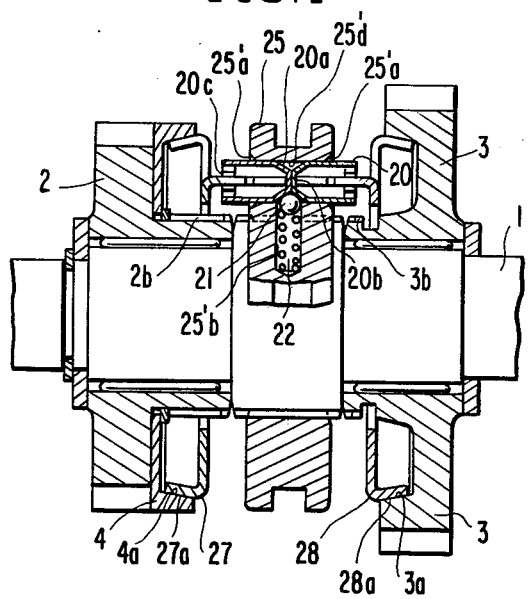
FIG. 7 is a longitudinal sectional view of a second embodiment according to the present invention.
Figure 9A:
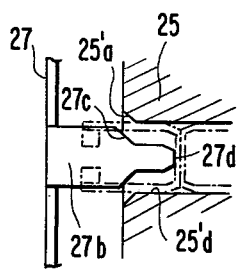
FIGS. 9a, 9b and 9c are schematic explanatory views showing a sequence of operations during synchronization.
Figure 9B:
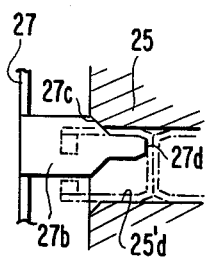
Figure 9C:
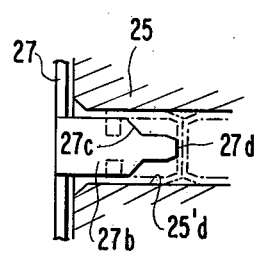
Figures 10A, 10B:
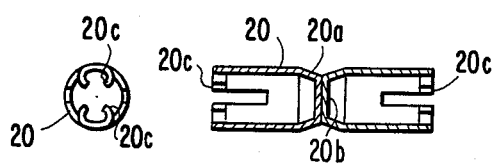
FIG. 10a is an end view of the thrust piece used in the second embodiment.
FIG. 10b is a longitudinal sectional view of the thrust piece used in the second embodiment.
Figures 11A, 11B:
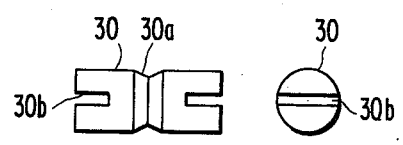

When the coupling sleeve 25 is moved to the left as viewed in FIGS. 7 and 9 the thrust piece 20 will also move to the left due to the disposition of the ball 21 in the annular recess 20a. The wall 20b of the thrust piece will engage the end 27d of the axial projection 27b on the synchronizer ring 27 and shift the friction surface 27a into engagement with the friction surface 4a. Due to the differential in rotational speed between the gear 2 and the coupling ring 25 which is splined to the shaft 1 the projection 27b will be shifted from the position shown in FIG. 9a to the position shown in FIG. 9b wherein the tapered shoulder 27c will be disposed in frictional engagement with the chamfered edge 25a' of the recess 25d' in the coupling sleeve 25. This will prevent further shifting of the coupling sleeve 25 until such time as synchronization is achieved between the gear 2 and the shaft 1. When synchronization is achieved it will be possible to cam the synchronizer ring 27 in the circumferential direction to align the wider guide portion of the axial projection 27b with the recess 25d' to permit further shifting of the coupling sleeve 25 to the left to engage the splines thereon simultaneously with the splines on the shaft 1 and the splines 2b on the gear 2.

While the invention has been particularly shown and described with reference to preferred embodiment thereof it will be understood by those in the art that various changes in form and details may be made therein without departing from the spirit and scope of the invention.

What is claimed is:

1. A synchronizer comprising a shaft having a longitudinally splined section, a pair of gears rotatably mounted on said shaft on opposite sides of said splined section, each of said gears having splines alignable with said splined section and having tapered surfaces, a pair of synchronizer rings including tapered surfaces complementary to and engageable with said tapered surfaces of said gears, respectively, and a plurality of axial extensions having stepped portions, the axial extensions of each of said rings extend toward each other with the extensions of one ring being superimposed on and coextensive with the extensions on the other ring, a sleeve member having splines disposed in sliding engagement with said splined section of said shaft and having recesses in which said extensions of said rings are positioned, said splines of said sleeve member being adapted to mesh with said splines of said gears and a single resilient detent means disposed between said sleeve member and said extensions of said rings to move said extensions with said sleeve until said stepped portions of said extensions are brought into contact with said recesses of said sleeve member.

2. A synchronizer as set forth in claim 1 wherein the tapered surface of one of said gears is provided on a ring member which is secured to said one of said gears.

3. A synchronizer as set forth in claim 1 wherein said resilient detent means is comprised of an annular spring secured to said sleeve and extending about said sleeve adjacent the radially innermost surfaces of said recesses and notch means in the radially innermost axial extension in each recess.

4. A synchronizer as set forth in claim 1 further comprising spring means operatively disposed between said pair of synchronizer rings to maintain the proper positions of said rings.

5. A synchronizer comprising a shaft having a longitudinally splined section, a pair of gears rotatably mounted on said shaft on opposite sides of said splined section. Each of said gears having splines alignable with said splined section and having tapered surfaces, a pair of synchronizer rings including tapered surfaces complementary to and engagable with said tapered surfaces of said gears, respectively, and a plurality of axial extensions having stepped portions, a sleeve member having splines disposed in sliding engagement with said spline section of said shaft and having recesses in which said extensions of said rings are positioned, said spline of said sleeve members being adapted to mesh with said spline of said gears, a thrust member disposed in each recess in engagement with the opposed end of the axial projections of said synchronizer rings, resilient detent means operatively disposed between said thrust member and said sleeve member whereby said extensions are moved with said thrust member and said sleeve member until said stepped portions of said extensions are brought into contact with said recesses of said sleeve member.

6. A synchronizer as set forth in claim 5 wherein said thrust member is comprised of a hollow cylindrical member having a transverse dividing wall intermediate the ends thereof disposed in engagement with the ends of said axial projections of said synchronizer rings which extend into said hollow cylindrical member from opposite directions.

7. A synchronizer as set forth in claim 5 wherein said thrust member is comprised of a substantially solid cylindrical member disposed in engagement with the opposed ends of said axial extensions.

8. A synchronizer as set forth in claim 5 wherein said thrust member is provided with axially extending slots extending in from opposite ends thereof for supporting and guiding said axial extensions of said synchronizer rings.

9. A synchronizer as set forth in claim 5 wherein said resilient detent means is comprised of a groove in said thrust member and a spring biased ball mounted on said sleeve.

* * * * *